(12) United States Patent
Gonzalez Franco et al.

(10) Patent No.: US 12,175,581 B2
(45) Date of Patent: Dec. 24, 2024

(54) REPRESENTING TWO DIMENSIONAL REPRESENTATIONS AS THREE-DIMENSIONAL AVATARS

(71) Applicant: Microsoft Technology Licensing, LLC, Redmond, WA (US)

(72) Inventors: Mar Gonzalez Franco, Seattle, WA (US); Payod Panda, Cambridge (GB); Andrew D. Wilson, Seattle, WA (US); Kori M. Inkpen, Redmond, WA (US); Eyal Ofek, Redmond, WA (US); William Arthur Stewart Buxton, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 17/855,431

(22) Filed: Jun. 30, 2022

(65) Prior Publication Data

US 2024/0005579 A1    Jan. 4, 2024

(51) Int. Cl.
| | | |
|---|---|---|
| *G06T 13/40* | (2011.01) | |
| *G06T 15/20* | (2011.01) | |
| *G06V 20/20* | (2022.01) | |
| *G06V 20/40* | (2022.01) | |
| *H04L 65/403* | (2022.01) | |

(52) U.S. Cl.
CPC .............. *G06T 13/40* (2013.01); *G06T 15/20* (2013.01); *G06V 20/20* (2022.01); *G06V 20/41* (2022.01); *H04L 65/403* (2013.01)

(58) Field of Classification Search
CPC  G06T 13/40; G06T 15/20–205; G06T 19/006
See application file for complete search history.

(56) References Cited

U.S. PATENT DOCUMENTS

| | | | |
|---|---|---|---|
| 2011/0267344 A1 | 11/2011 | Germann et al. | |
| 2019/0180509 A1* | 6/2019 | Laaksonen | G06F 3/04815 |
| 2021/0327160 A1* | 10/2021 | Shiraga | G06T 19/006 |

(Continued)

OTHER PUBLICATIONS

Aubel, et al., "Real-Time Display of Virtual Humans: Levels of Details and Impostors", In Journal of IEEE Transactions on Circuits and Systems for Video Technology 10, Issue 2, Mar. 2000, pp. 1-25.

(Continued)

*Primary Examiner* — Charles Tseng

(57) ABSTRACT

Systems and methods for representing two-dimensional representations as three-dimensional avatars are provided herein. In some examples, one or more input video streams are received. A first subject, within the one or more input video streams, is identified. Based on the one or more input video streams, a first view of the first subject is identified. Based on the one or more input video streams, a second view of the first subject is identified. The first subject is segmented into a plurality of planar object. The plurality of planar objects are transformed with respect to each other. The plurality of planar objects are based on the first and second views of the first subject. The plurality of planar objects are output in an output video stream. The plurality of planar objects provide perspective of the first subject to one or more viewers.

20 Claims, 10 Drawing Sheets

(56) References Cited

U.S. PATENT DOCUMENTS

2023/0388796 A1* 11/2023 Soryal .................... H04L 67/10

OTHER PUBLICATIONS

"International Search Report and Written Opinion Issued in PCT Application No. PCT/US23/023455", Mailed Date: Sep. 7, 2023, 12 Pages.
Waschbusch, et al., "3D Video Billboard Clouds", In Computer Graphics Forum, Sep. 2007, pp. 561-569.

* cited by examiner

REPRESENTING TWO DIMENSIONAL REPRESENTATIONS AS THREE-DIMENSIONAL AVATARS

BACKGROUND

Video conferencing may be used to allow for one or more meeting participants to join a meeting remotely. Hybrid meetings may include a plurality of participants who are joining the meeting via a plurality of different mediums, such as joining the meetings in-person, remotely, and/or via virtual avatars.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for representing two-dimensional representations as avatars in a three-dimensional space.

Mechanisms described herein may be used to generate three dimensional avatars for hybrid meetings, such as meetings that incorporate metaverse technologies (e.g., virtual reality and/or augmented reality technology). In some examples, one or more input video streams may be received. One or more subjects, such as a person, animal, or object, may be identified within the one or more input video streams. Mechanisms provided herein may segment each of the one or more subjects into a plurality of planar objects (e.g., billboards) to improve perspective views of the one or more subjects, with respect to one or more participants in a hybrid meeting. Additionally, or alternatively, different views of the one or more subjects may be identified, within the one or more input video streams. The different views of the one or more subjects may be presented based on relative positions in a room. The relative positions in the room may be associated with participants of a hybrid meeting that the room is associated therewith.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
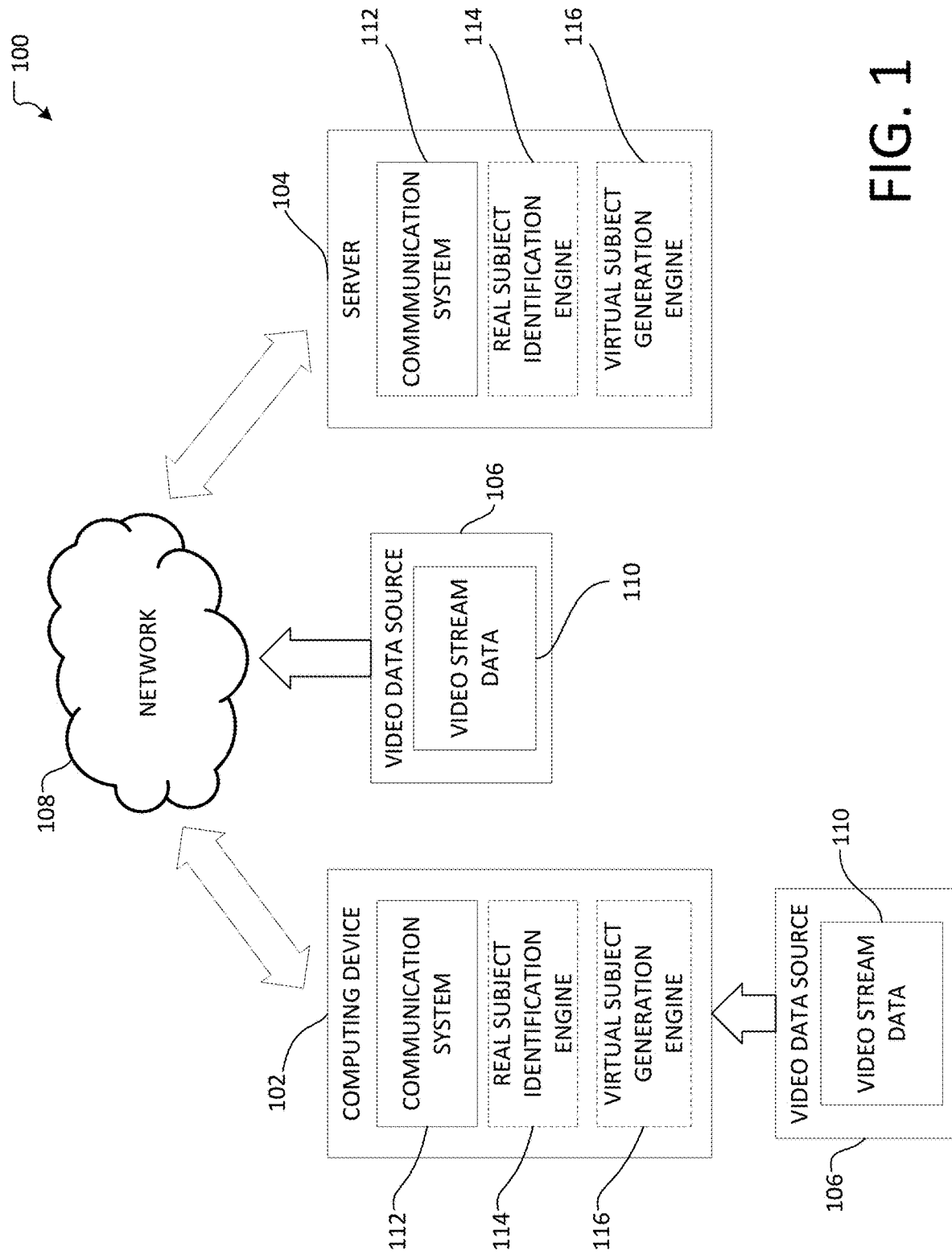
FIG. 1 illustrates an overview of an example system, according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As discussed above, video conferencing may be used to allow for one or more meeting participants to join a meeting remotely. Hybrid meetings may include a plurality of participants who are joining the meeting via a plurality of different mediums, such as joining the meetings in-person, remotely (e.g., via a video and/or audio communications device), and/or via virtual avatars. In this respect, hybrid meetings may allow for participants to join meetings using a vast array of metaverse technologies (e.g., virtual reality headsets, augmented reality headsets, audio communication technology, video communication technology, etc.).

The rise of remote work in recent years has prompted developments in related technology that allow for a plurality of individuals (e.g., teammates, colleagues, board members, family members, etc.) to meet or collaborate, without having to physically travel to the same room as each other. However, existing technologies for remote work, such as conventional video conferencing software may provide limited options for immersing remote participants into a hybrid meeting environment. Further, some existing technologies for remote work may be computationally intensive In some examples disclosed herein, a virtual subject (e.g., a person, animal, or object) may be segmented or otherwise broken up into a plurality of planar objects (e.g., billboards) to provide a perspective view of the subject to one or more viewers of the virtual subject. Specifically, one or more input video streams may be received from one or more cameras. A first subject, such as a person, may be identified within the one or more input video streams. A first view of the first subject, and a second view of the first subject, may be identified, based on the one or more input video streams. The first subject may be segmented into a plurality of planar objects (e.g., planes that are transformed with respect to each other). The plurality of planar objects may be based on the first and second views of the first subject. Further, the plurality of planar objects may be output in an output video stream.

Some people may be tuned to accept planar objects, such as billboards, as realistic from everyday experiences such as, for example, watching photos, television, and/or cinema planar displays, from an angle. When breaking an object into several billboards, perspective deformation may be reduced across each part of the broken object. Further, artifacts can be generated in the transition between billboards. In some examples, a continuous transition, via a curved proxy, may be used between billboards. Additionally, or alternatively, in some examples, two overlapping billboards may be blended together. Additional and/or alternative mechanisms for transitioning between billboards may be recognized by those od ordinary skill in the art, such as to reduce perspective deformation between billboards.

Billboards may also be represented by multiple planes and/or thin volumetric representations to improve plenoptic function and/or view dependent effect. For example, billboards may be represented using plenovoxel (e.g., plenoptic volume element) representations. Plenvoxel representations can be used to improve fidelity without neural networks. Fidelity may be improved by using standard mean squared error (MSE) reconstruction loss relative to training images, along with a total variation regularizer. Additionally, or alternatively, billboards may be represented using neural radiance field (NERF) representations. Using NERF representations, novel views of complex scenes may be synthesized by improving an underlying continuous volumetric scene function, using a sparse set of input views.

In some other examples disclosed herein, a virtual subject may be observed from a plurality of views, based on respective positions of a plurality of hybrid meeting participants. Specifically, a plurality of input video streams may be received as part of a hybrid meeting. A geometry of a room may be identified that corresponds to the hybrid meeting. A first subject at a first position in the room, and a second subject at a second position in the room may be identified. A first view of the first subject may be determined, based on a first of the plurality of input video streams. A second view of the first subject may be determined, based on a second of the plurality of input video streams. Further, the first view of the first subject may be output, based on the second position in the room.

Accordingly, aspects of the present disclosure relate to representing two-dimensional representations, for example, two-dimensional representations of a user, as avatars in a three-dimensional space, to improve user engagement, among providing other benefits.

Specifically, mechanisms disclosed herein provide improved user engagement by creating perspective views of users, based on one or more two-dimensional views that are received from one or more input video streams, at a relatively lower computational cost than conventional systems that may convert two-dimensional representations to three-dimensional avatars, such as by using three-dimensional point clouds. Additional advantages may be recognized by those of ordinary skill in the art, at least in view of the teachings disclosed herein.

Billboards or planar objects described herein may be rendered using a plurality of techniques. An example technique for rendering billboards described herein is via a neural radiance field (NERF). NERF techniques can combine multi-view images to one volumetric representation to generate a better view (e.g., a view with increased fidelity) than an original view (e.g., an original billboard view). The volumetric representation enables new views of objects to be generated with no reference geometry, by rendering rays (e.g., camera rays) to project output colors and densities (e.g., pixels) into an image. In some examples, rendering of a generic person model can be performed by identifying rays along each limb of a person, and bending the rays that query a NERF, according to a motion of one or more of the limbs of the person.

FIG. 1 shows an example of a system 100 in accordance with some aspects of the disclosed subject matter. The example system 100 may be a system for representing two-dimensional images as avatars in a three-dimensional space, such as a hybrid meeting space. As shown in FIG. 1, the system 100 includes a computing device 102, a server 104, a video data source 106, and a communication network or network 108. The computing device 102 can receive video stream data 110 from the video data source 106, which may be, for example a webcam, video camera, video file, etc. Additionally, or alternatively, the network 108 can receive video stream data 110 from the video data source 106, which may be, for example a webcam, video camera, video file, etc.

Computing device 102 may include a communication system 112, a real subject identification engine or component 114, and a virtual subject generation engine or component 116. In some examples, computing device 102 can execute at least a portion of the real subject identification component 114 to identify, locate, and/or track a subject (e.g., a person, animals, or object) from the video stream data 110. Further, in some examples, computing device 102 can execute at least a portion of the virtual subject generation component 116 to determine views, planar object (e.g., billboard) segmentations, or planar object configurations of a subject within the video stream data 110, such as the subject identified by the real subject identification component 114. Views of the subject may be determined based on a single set of video stream data 110 and/or a plurality of video stream data sets 110. Further, the planar objects may be segmented based on one or more pivot points of the subject. Additionally, or alternatively, the planar objects may be generated or otherwise configured based on a trained machine learning model that is trained to reduce characteristic errors, based on perspective, between an altered image and a ground truth image, with respect to a point of reference within a hybrid meeting space.

In some examples, a trained classifier may be used to detect people, as well as a pose of a skeleton of each of the people, based on 2-dimensional videos (e.g., video stream data 110). The 2-dimensional videos may be received from RGBD (red, green, blue colors, and depth) video sources (e.g., video data source 106). RGBD video may be received from a line of motion sensing input device (e.g., for a gaming system or video system) that includes one or more RGB cameras, as well as an infrared project and detectors that map depth through either structured light or time of flight calculations. Additionally, or alternatively, RGBD video may be received from multiple video streams of a person (e.g., stereo cameras). The skeleton can be a guide for a simple geometry proxy. A generic human model may be used to project pixels from one or more video sources to a new view. One example proxy described herein is an articulated model, where each limb of a person is modeled by a different plane. Further, depth data obtained from the video stream data 110 can be used for segmentation of a person from a video, generating a better proxy geometry than a planar object, or construction of volumetric representation.

Server 104 may include a communication system 112, real subject identification engine or component 114, and a virtual subject generation engine or component 116. In some examples, server 104 can execute at least a portion of the real subject identification component 114 to identify, locate, and/or track a subject (e.g., a person, animal, or object) from the video stream data 110. Further, in some examples, server 104 can execute at least a portion of the virtual subject generation component 116 to determine views, planar object segmentations, or planar object configurations of a subject within the video stream data 110, such as the subject identified by the real subject identification component 114. Views of the subject may be determined based on a single set of video stream data 110 and/or a plurality of video stream data sets 110. Further, the planar objects may be segmented based on one or more pivot points of the subject. Additionally, or alternatively, the planar objects may be generated or otherwise configured based on a trained machine learning model that is trained to reduce characteristic errors, based on perspective, between an altered image and a ground truth image, with respect to a point of reference within a hybrid meeting space.

Additionally, or alternatively, in some examples, computing device 102 can communicate data received from video data source 106 to the server 104 over a communication network 108, which can execute at least a portion of the real subject identification component 114 and/or the virtual subject generation component 116. In some examples, the real subject identification component 114 may execute one or more portions of methods/processes 400 and/or 600 described below in connection with FIGS. 4 and 6. Further, in some examples, virtual subject generation component 116 may execute one or more portions of methods/processes 400 and/or 600 described below in connection with FIGS. 4 and 6.

In some examples, computing device 102 and/or server 104 can be any suitable computing device or combination of devices, such as a desktop computer, a laptop computer, a smartphone, a tablet computer, a wearable computer, a server computer, a virtual machine being executed by a physical computing device, a head mounted display (HMD) (e.g., a virtual reality headset and/or an augment reality headset), etc.

In some examples, video data source 106 can be any suitable source of video stream data (e.g., data generated from a computing device, data generated from a webcam, data generated from a video camera, etc.) In a more particular example, video data source 106 can include memory storing video stream data (e.g., local memory of computing device 102, local memory of server 104, cloud storage, portable memory connected to computing device 102, portable memory connected to server 104, etc.). In another more particular example, video data source 106 can include an application configured to generate video stream data (e.g., a teleconferencing application with video streaming capabilities, a subject identification application, and/or a virtual subject generation application being executed by computing device 102, server 104, and/or any other suitable computing device).

In some examples, video data source 106 can be local to computing device 102. For example, video data source 106 can be a camera that is coupled to computing device 102. Additionally, or alternatively, video data source 106 can be remote from computing device 102 and can communicate video stream data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

While the example system 100 includes a single computing device 102, a single server 104, and a single network 108, it should be recognized by those of ordinary skill in the art that there may be a plurality of computing device 102, a plurality of servers 104, and/or a plurality of networks 108. Further, there may be a plurality of video data sources 106 in communication with one or more computing device (e.g., computing device 102). Additionally, or alternatively, there may be a plurality of video data sources 106 in communication with one or more networks (e.g., network 108).

Figure 2:
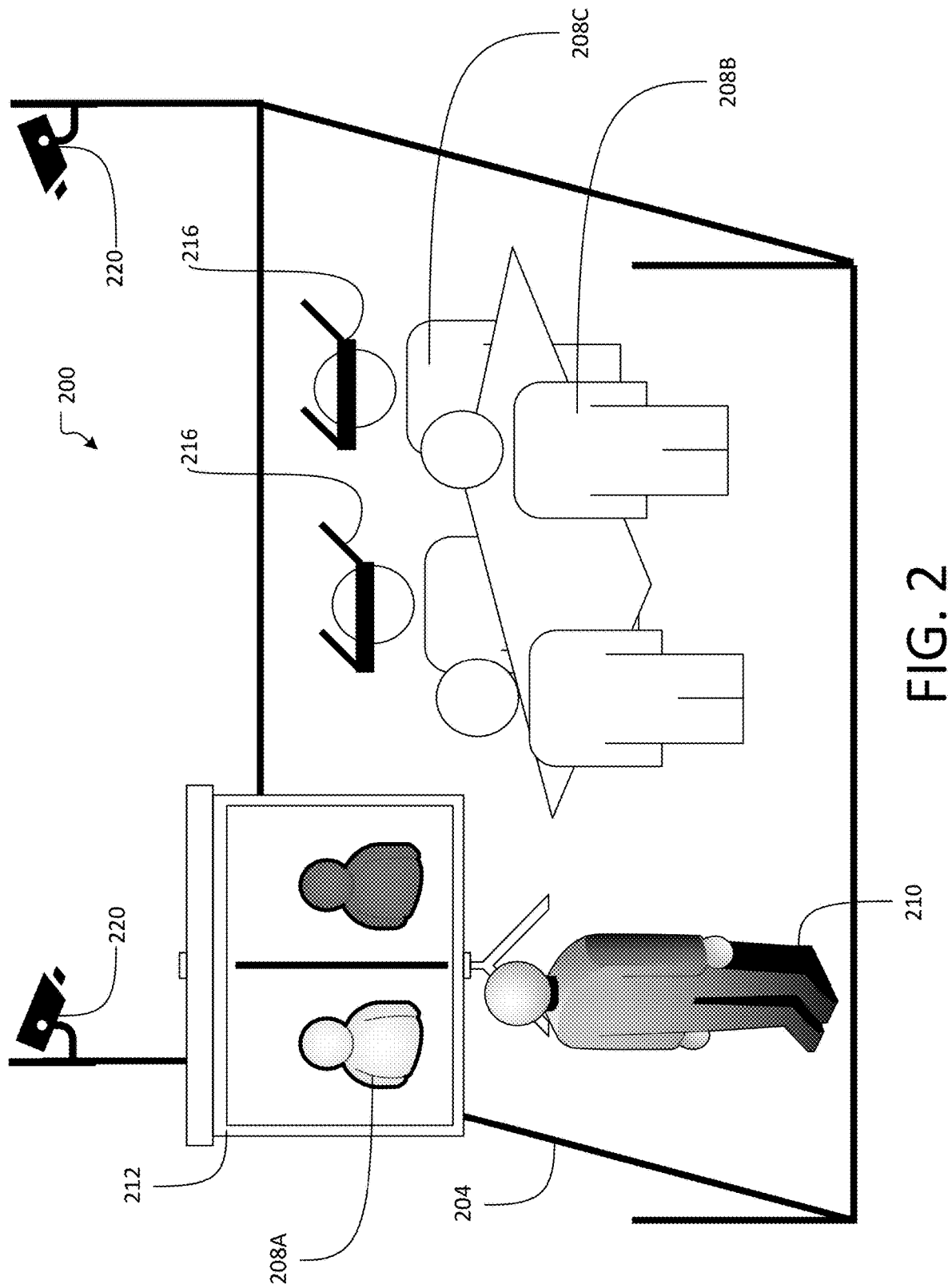
FIG. 2 illustrates an example hybrid meeting, according to some aspects described herein.

FIG. 2 illustrates an overview of an example hybrid meeting 200, according to some aspects described herein. The hybrid meeting 200 may occur within a room 204. In some examples, the room 204 may be a physical room. Alternatively, in some examples, the room 204 may be a virtual room. A plurality of participants 208 may be participating in the hybrid meeting 200. A first subset 208A of the plurality of participants 208 may be participating in the hybrid meeting 200, via a video conference. A second subset 208B of the plurality of participants 208 may be physically present at the hybrid meeting 200. A third subset 208C of the plurality of participants 208 may wear head mounted displays (HMD) 216 to view one or more generated avatars 210 corresponding to remote participants (e.g., of the first subset 208A or in-person subset 208B).

The first subset 208A of the plurality of participants 208 may each be remote from the room 204. The first subset 208A may each have computing devices (e.g., computing devices 102) and/or video data sources (e.g., video data source 106) that are local to each participant within the first subset 208A, and that allow each participant within the first subset 208A to participate in the hybrid meeting 200. The first subset 208A may participate in the hybrid meeting 200 by being presented on a display screen 212, being projected onto a surface of the room 204, being projected onto an object within the room 204 (e.g., a chair, table, etc.), or otherwise being displayed within the room 204.

The second subset 208B of the plurality of participants 208 may each be physically located within the room 204. The third subset 208C may be physically located in the same room as the second subset 208B or in a remote location. The room 204 may include one or more cameras 220 disposed therein to generate video streams of one or more participants from the second subset 208B to one or more remote users (e.g., the first subset 208A of the plurality of participants 208 and/or the third subset 208C of the plurality of participants 208).

The generated avatar 210 corresponding to one or more participants within the third subset 208C may be visible to at least some of the participants 208 who are remote from the hybrid meeting 200. Additionally, and/or alternatively, at least some of the plurality of participants 208 may be able to view the one or more generated avatars 210 by wearing the head mounted display (HMD) 216. The HMD 216 may be a virtual-reality headset. Alternatively, the HMD 216 may be an augmented-reality headset. In still further aspects, the one or more generated avatars 210 may be displayed on the display screen 212. Additionally, or alternatively, the one or more generated avatars 210 may be displayed on one or more computing devices (e.g., computing device 102) that are remote and/or local to the room 204. In this respect, the one or more generated avatars 210 may be viewable by any heterogenous endpoint (e.g., HMDs, laptops, smartphones, display screens in a physical room, projectors, wearable computing devices, etc.) at which one of the plurality of participants 208 interfaces with the hybrid meeting 200.

The one or more cameras 220 (e.g., 2-dimensional and/or 2.5-dimensional RGBD cameras) may be similar to the video data source 106 described earlier herein, with respect to FIG. 1. The one or more cameras 220 may collect a batch of still images taken at sequential time intervals. Additionally, or alternatively, the one or more cameras 220 may collect single instances of still images taken at moments of time. Additionally, or alternatively, the one or more cameras 220 may collect a live feed of video data. The one or more cameras 220 may be configured at specific locations within the room 204 based on user preference. Additionally, there may be any number of cameras 220 within the room 204, depending on different advantages or disadvantages that may be recognized by those of ordinary skill in the art (e.g., a number of desired camera angles, a desired overhead for processing video/image data received from the cameras 220, etc.).

Figure 3:
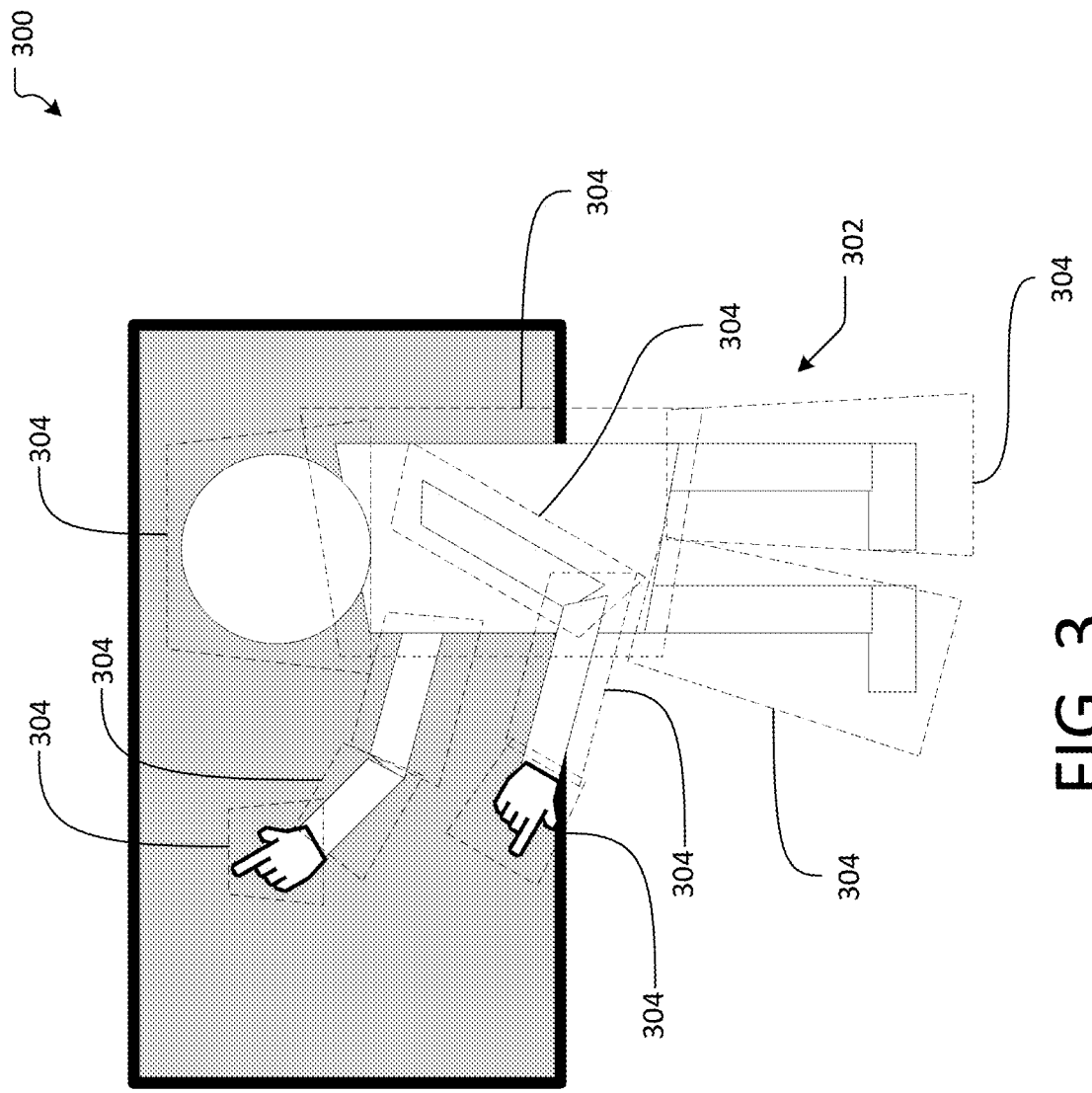
FIG. 3 illustrates an example of generating one or more views of a subject, according to some aspects described herein.

FIG. 3 illustrates an example 300 of generating one or more views of a subject 302, according to some aspects described herein. The subject 302 may be a person, animal, and/or object that is generated based on video stream data (e.g., video stream data 110). Additionally, or alternatively, in some examples, the subject 302 may be generated based on one or more still images (e.g., two-dimensional images) and/or one or more animations corresponding to a physical version of the subject 302. The subject 302 shown in the example 300 is a virtual subject, which may be similar to the generated avatar 210 described earlier herein with respect to FIG. 2.

The subject 302 may be located within a hybrid meeting space (e.g., a space in which the hybrid meeting 200 occurs). Further, the subject 302 may correspond to a physical subject (not shown) who is remote from the hybrid meeting space. The subject 302 may be segmented into a plurality of planar objects 304. The plurality of planar objects 304 may be a plurality of billboards. The plurality of billboards 304 may be planes that are transformed with respect to each other. The planes may be 2-dimensional planes and/or curved planes. Further, the planes may be rotated at angles with respect to each other (e.g., not co-planar).

The subject 302 may include one or more pivot points at which two or more portions of the subject 302 are configured to rotate thereabout. For example, the subject 302 is a person, wherein the one or more pivot points are joints about which body parts are configured to rotate (e.g., wrist, elbow, knees, etc.). The one or more billboards may be segmented at the pivot points. The one or more billboards may be connected via virtual joints, and the virtual joints may be articular points of rotation.

The one or more billboards 304 may be curved into each other, stretched to overlap or intersect each other, blurred into each other, blended into each other, discretely abutted against each other, or otherwise visually processed to form a virtual subject (e.g., the subject 302) that corresponds to a physical subject, such as a subject who may be remotely joining a hybrid meeting. Each of the one or more billboards 304 may be translated and/or rotated within a 3-dimensional space (e.g., that includes an x-plane, y-plane, and z-plane) to form a perspective of a portion of the subject 302 contained within the billboard 304 being translated and/or rotated.

In the example 300, one or more of the billboards 304 corresponding to a body of the subject 302 may intentionally be rotated so that geometry of the subject 302 is visible to a viewer. Determining which aspects of the subject 302 (e.g., contained on, or within, one or more of the billboards 304) may be visually preferable to face a viewer may be configurable by a user. Additionally, determining which aspects of the subject 302 may be visually preferable to face a viewer may be learned by a machine learning model. For example, participants in a hybrid meeting may engage (e.g., watch, listen, etc.) more often (e.g., for a longer measurable duration of time) with a subject (e.g., subject 302) that has billboards (e.g., billboards 304) arranged in a particular manner. Such examples may include, a face facing a viewer, palms of a hand facing a user, a chest facing a user, etc. Additional, and/or alternative configurations that may be desirable to increase user engagement with the subject 302 may be recognized by those of ordinary skill in the art, using mechanisms disclosed herein.

In some examples, a skeleton of the subject 302 may be generated or detected, based on video stream data (e.g., video stream data 110). The skeleton may be rendered to a new view, where each limb of the subject 302 is aligned along its own respective axis and facing a point of reference corresponding to the new view. The point of reference may be a camera of a computing device (e.g., computing device 102). In some examples (e.g., where there are no constraints), the skeleton can be left in the same arrangement as the original video and a single billboard (e.g., billboard 304) can be generated for the entire body of the subject 302.

Alternatively, in some examples, such as if the subject's 302 hand is touching a whiteboard, a separate billboard can be generated for each bones in the subject's 302 hand to satisfy constraints for the new view. Additional and/or alternative examples of visual constraints that may impact visual rendering of a subject, when generating new views, may be recognized by those of ordinary skill in the art.

The billboards 304 may be used to generate additional environment effects, that can enhance the realism of a composite scene—such as rendering a reflection of the subject 302 onto a meeting table, shadows of the subject's 302 hands and body onto the table and/or walls, and even projecting shadows on a physical meeting table in a physical room, to better represent remote participant (e.g., alternatively, or in addition to, a view of the remote participant on a display screen).

The segmented billboards 304 may be envisioned as an origami configuration in which each of the segmented billboards 304 are folded with respect to each other to provide a three-dimensional avatar of a user (e.g., the subject 302) that includes perspective from one or more views. Such a method may improve upon existing methods of generating three-dimensional avatars by being relatively less computationally expensive, while still providing perspective information to viewers that improve user experience.

Additionally, or alternatively, the subject 302 may be segmented into the plurality of billboards 304, using a machine learning model. The machine learning model may be trained to generate the segmented billboards 304 based on a plurality of constraints or factors. For examples, the plurality of constraints may include a computational cost of generating the segmented billboards 304 (e.g., for computing device 102 and/or server 104), one or more input video streams, an error between a physical subject and a generated avatar (e.g., the subject 302) that is formed by the segmented billboards 304. The physical subject to which the generated avatar corresponds may be found within the one or more input video streams. Additional and/or alternative constraints may be recognized by those of ordinary skill in the art.

Further, it should be recognized that while generating a relatively large amount of billboards (e.g., billboards 304) may reduce the error between the subject 302 and a corresponding physical subject, generating the relatively large amount of billboards may also increase computational overhead. Therefore, the training of the machine learning model may further depend on a policy factor that weights variables from the plurality of variables, based on user-preference and/or economic factors.

Still further, it should be recognized that a billboard (e.g., billboard 304) by itself, may not be photorealistic, but rather a representation that we are used to seeing on flat screens that are viewed from an angle. Whenever one billboard is segmented into a plurality of billboards, irritating artifacts (e.g., anomalies apparent during visual representation) may be generated. Therefore, in some examples, it may be beneficial to use as few billboards as possible, such as when a mapping of a subject (e.g., subject 302) via a single billboard (e.g., one of billboards 304) does not reach some needed constraint (e.g., an improved perspective view). Therefore, a cost of increasing a number of billboards may not just be more overhead, but also an increased number of artifacts. Such a factor may be considered when determining into how many segments a subject (e.g., subject 302) should be segmented, with each segment being represented by a respective billboard.

The plurality of billboards 304 may be output in an output video stream. For example, the plurality of billboards 304 may form the subject 302 and the subject 302 may be output in the output video stream. The output video stream may be output to a computing device (e.g., computing device 102), which may be, for example, a display screen of a computer on which one or more users are engaging in a videoconference, and/or a head-mounted display (e.g., HMD 216). Therefore, users may engage with the subject 302, after the subject 302 is generated, via the plurality of billboards 304, in the output video stream.

Figure 4:
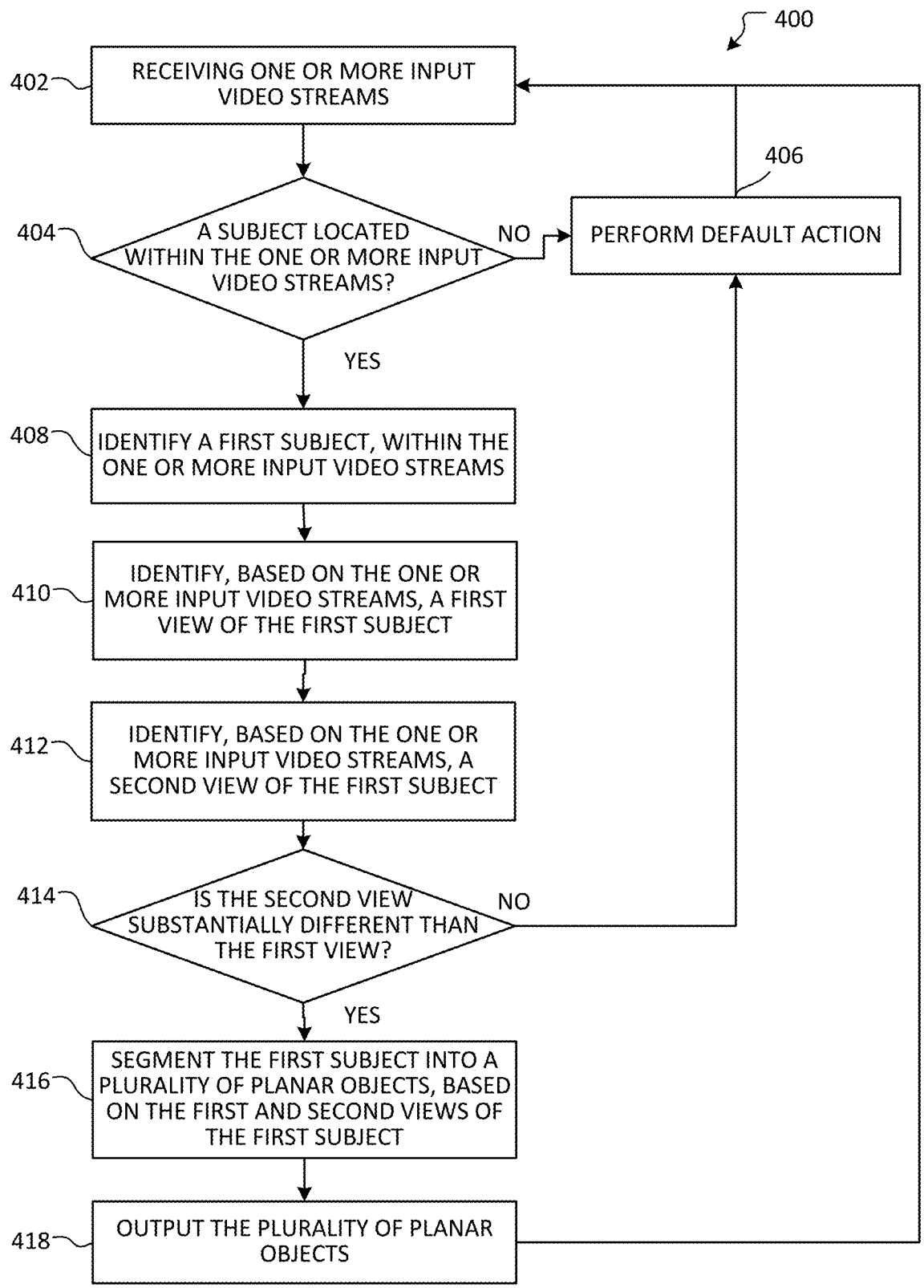
FIG. 4 illustrates an overview of an example method, according to some aspects described herein.

FIG. 4 illustrates an example method 400 according to some aspects described herein. The method 400 may be a method of representing two-dimensional images of a user as avatars or subjects (e.g., avatar 210 or subject 302) in a three-dimensional space and/or of generating a three-dimensional avatar or subject. In examples, aspects of method 400 are performed by a device, such as computing device 102 and/or server 104 discussed above with respect to FIG. 1.

Method 400 begins at operation 402, wherein one or more input video streams are received. For example, the input video stream may be received from a video data source (e.g., video data source 106 discussed above with respect to FIG. 1). As mentioned above, the video data source may be, for example a webcam, video camera, video file, etc. In some examples, the operation 402 may include obtaining the input video stream. For example, the input video stream may be obtained by executing commands, via a processor, that cause the input video stream to be received by, for example, a real subject identification component, such as the real subject identification component 114. Further, in some examples operation 402 may include receiving a plurality of input video streams.

In some examples, the input video stream may include three-dimensional scenes. Accordingly, aspects of the present disclosure described below (e.g., identifying, segmenting, tracking, etc.) can be applied to the three-dimensional scenes in a similar manner as they would be applied to a two-dimensional scene. For example, systems described herein can identify a three-dimensional sub-scene of the input video stream (e.g., containing a person, or object, or animal of interest), and partition or segment a subject within the three-dimensional sub-scene.

At operation 404, a determination is made as to whether the input video stream contains a subject (e.g., one or more persons, animals, objects, etc.). Further in some examples, a determination may be made as to whether a plurality of input video streams contain a subject. The subject may be identified by one or more computing devices (e.g., computing device 102, and/or server 104). Specifically, the one or more computing devices may receive visual data from a visual data source (e.g., video data source 106) to identify a person. The visual data may be processed, using mechanisms described herein, to recognize that one or more persons, one or more animals, and/or one or more objects of interest are present. The one or more persons, one or more animals, and/or one or more objects may be recognized based on a presence of the persons, animals, and/or objects, motions of the persons, animals, and/or objects, and/or other scene properties of the input video stream, such as differences in color, contrast, lighting, spacing between subjects, etc.

Additionally, or alternatively, at determination 404, the one or more subjects may be identified by engaging with a specific software (e.g., joining a call, joining a video call, joining a chat, or the like). For example, a person may be identified by logging into a specific application (e.g., via a passcode, biometric entry, or registration number). Therefore, when the specific application is logged into, the person is thereby identified. For example, when a person joins a video call, it may be determined that the input video stream contains a subject (i.e., the person). Additionally, or alternatively, at determination 404, it may be determined that the input video stream contains a subject by identifying the subject using a radio frequency identification tag (RFID), an ID badge, a bar code, or some other means of identification that is capable of identifying a subject via some technological interface.

It will be appreciated that method 400 is provided as an example where a subject is or is not identified at determination 404. In other examples, it may be determined to request clarification or disambiguation from a user (e.g., prior to proceeding to either operation 406 or 408), as may be the case when a confidence level associated with identifying a subject is below a predetermined threshold or when multiple subjects are identified, among other examples. In examples where such clarifying user input is received, an indication of the subject may be stored (e.g., in association with the received input video stream) and used to improve accuracy when processing similar future video stream inputs.

If it is determined that there is not a subject contained within the input video stream, flow branches "NO" to operation 406, where a default action is performed. For example, the input video stream may have an associated pre-configured action (such as not presenting the input video stream). In other examples, method 400 may comprise determining whether the input video stream has an associated default action, such that, in some instances, no action may be performed as a result of the received input video stream (e.g., the input video stream may be displayed using conventional methods). Method 400 may terminate at operation 406. Alternatively, method 400 may return to operation 402 to provide a continuous video stream feedback loop.

If, however, it is determined that the input video stream contains a subject, flow instead branches "YES" to operation 408, where a first subject is identified within the one or more input video streams. The first subject may be a person, animal, or object. Further, in instances where there are a plurality of input video streams, the first subject may be identified in each of the plurality of input video streams, such as, for example by visual recognition of common characteristics within each of the input video streams that correspond to the first subject.

Flow advances to operation 410, wherein based on the one or more input video streams, a first view of the first subject is identified. The first view may be a front view, side view, rear view, top view, perspective view, or any type of view that may be captured of the first subject, by a video data source (e.g., video data source 106), such as a camera. The first view may be identified with respect to reference points or shapes within a room in which the first subject is located. For example, the room may have a specific geometry that is recognized or received by mechanisms disclosed herein. The first view may be identified based on the geometry of the room. Additionally, or alternatively, the first view may be identified based on a relative rotation of the first subject, within the one or more input video streams.

Flow advances to operation 412, wherein based on the one or more input video streams, a second view of the first subject is identified. The second view may be a front view, side view, rear view, top view, perspective view, or any type of view that may be captured of the first subject, by a video data source (e.g., video data source 106), such as a camera. The second view may be identified with respect to reference points or shapes within a room in which the first subject is located. For example, the room may have a specific geometry that is recognized or received by mechanisms disclosed herein. The second view may be identified based on the geometry of the room. Additionally, or alternatively, the second view may be identified based on a relative rotation of the first subject, within the one or more input video streams, such as based on a relative rotation of the first subject, with respect to the first view. In some examples, operations 410 and 412 may be combined, such as in instances where, based on a plurality of input video streams, a plurality of view of the first subject are identified.

At determination 414, it is determined whether the second view of operation 412 is substantially different from the first view of operation 410. For example, if a second view is substantially the same as a first view, then it may be computationally favorable to output one of the first view or the second view, from the one or more input video streams, without performing further processing based on the first view and the second view. Further, the determining of whether the second view is substantially different from the first view may include calculating an error between visual components of the first view and visual components of the second view. A user may configure a predetermined threshold at which the second view is determined to be substantially different from the first view.

If it is determined that the second views is not substantially different than the first view, flow branches "NO" to operation 406, where a default action is performed. For example, as mentioned above, one of the first view or the second view, from the one or more input video streams may be output, without further processing, to reduce a computational workload of mechanisms described herein. Additionally, or alternatively, in some examples, the first view or the second view may have an associated pre-configured action. In other examples, method 400 may comprise determining whether the first view or the second view have an associated default action, such that, in some instances, no action may be performed as a result of the identified first view and/or second view of the first subject. Method 400 may terminate at operation 406. Alternatively, method 400 may return to operation 402 to provide a continuous video stream feedback loop.

If however, it is determined that the second view is substantially different than the first view, flow instead branches "YES" to operation 416, where the first subject is segmented into a plurality of planar objects, based on the first and second views of the first subject. The plurality of planar objects may be a plurality of billboards. As described earlier herein with respect to FIG. 3, the plurality of billboards may be planes (e.g., 2-dimensional planes and/or curved planes) that are translated with respect to each other. In some examples, the plurality of planar objects may be comparable to origami structurers that are folded, such as to generate a three-dimensional avatar of the first subject, in their folded configuration, by incorporating a plurality of views (e.g., the first view and the second view) to provide perspective of the first subject to one or more viewers. Therefore, each of the plurality of billboards may face a camera (e.g., a planar surface of each of the plurality of billboards faces a camera), such that content on each of the plurality of billboards is viewable by a user (e.g., a participant in a hybrid meeting viewing a virtual avatar that is formed by the plurality of billboards).

The first subject may include one or more pivot points at which two or more portions of the first subject are configured to rotate thereabout. For example, if the first subject is a person or an animal, the one or more pivot points may be joints about which body parts are configured to rotate. The one or more planar objects may be segmented at the pivot points. Further, the one or more planar objects may be connected via virtual joints. The virtual joints may be articular points of rotation that correspond to physical joints of the first subject.

The one or more planar objects (e.g., one or more billboards) may be curved into each other, stretched to overlap or intersect each other, be blurred into each other, be blended into each other, be discretely abutted to each other, or otherwise visually processed to form a subject (e.g., in the form of a generated avatar) that corresponds to a physical subject (e.g., the first subject within the one or more input video streams).

Additionally, or alternatively, the first subject may be segmented into a plurality of planar objects, using a machine learning model. The machine learning model may be trained to generate segmented planar objects (e.g., billboards) based on a plurality of variables. For examples, the plurality of variables may include a computational cost of generating the segmented planar objects, one or more input video streams, an error between a generated avatar that is formed by the segmented planar objects and the physical subject, within the one or more input video streams, to which the generated avatar corresponds, etc. While generating a relatively large amount of planar objects may reduce the error between the generated avatar and the physical subject, generating the relatively large amount of planar objects may also increase computational overhead. Therefore, the training of the machine learning model may further depend on a policy factor that weights variables from the plurality of variables, based on user-preference and/or economic factors.

At operation 418, the plurality of planar objects may be output. The plurality of planar objects may be output in an output video stream. For example, the plurality of planar objects may form a generated three-dimensional avatar that is output in the output video stream. The output video stream may be output to a computing device (e.g., computing device 102), which may be, for example, a display screen of a computer on which one or more users are engaging in a videoconference, and/or a head-mounted display (e.g., HMD 216).

Generally, method 400 provides an example where a subject may be generated using segmented planar objects that are arranged or transformed with respect to each other. The segmented planar objects may be envisioned as an origami configuration in which each of the segmented planar objects are folded with respect to each other to provide a three-dimensional avatar of a user that includes perspective from one or more views. Such a method may improve upon existing methods of generating three-dimensional avatars by being relatively less computationally expensive, while still providing perspective information to viewers that improve a user's experience.

Method 400 may terminate at operation 418. Alternatively, method 400 may return to operation 402 to provide a continuous video stream feedback loop. The method 400 may be run continuously. Alternatively, the method 400 may iterate through at specified intervals over regular or irregular durations of time. Additionally, or alternatively, the method 400 may be triggered to execute by a specific action, such as, for example, by a computing device that receives an input video stream and/or by a user that executes a specific command.

Figure 5:
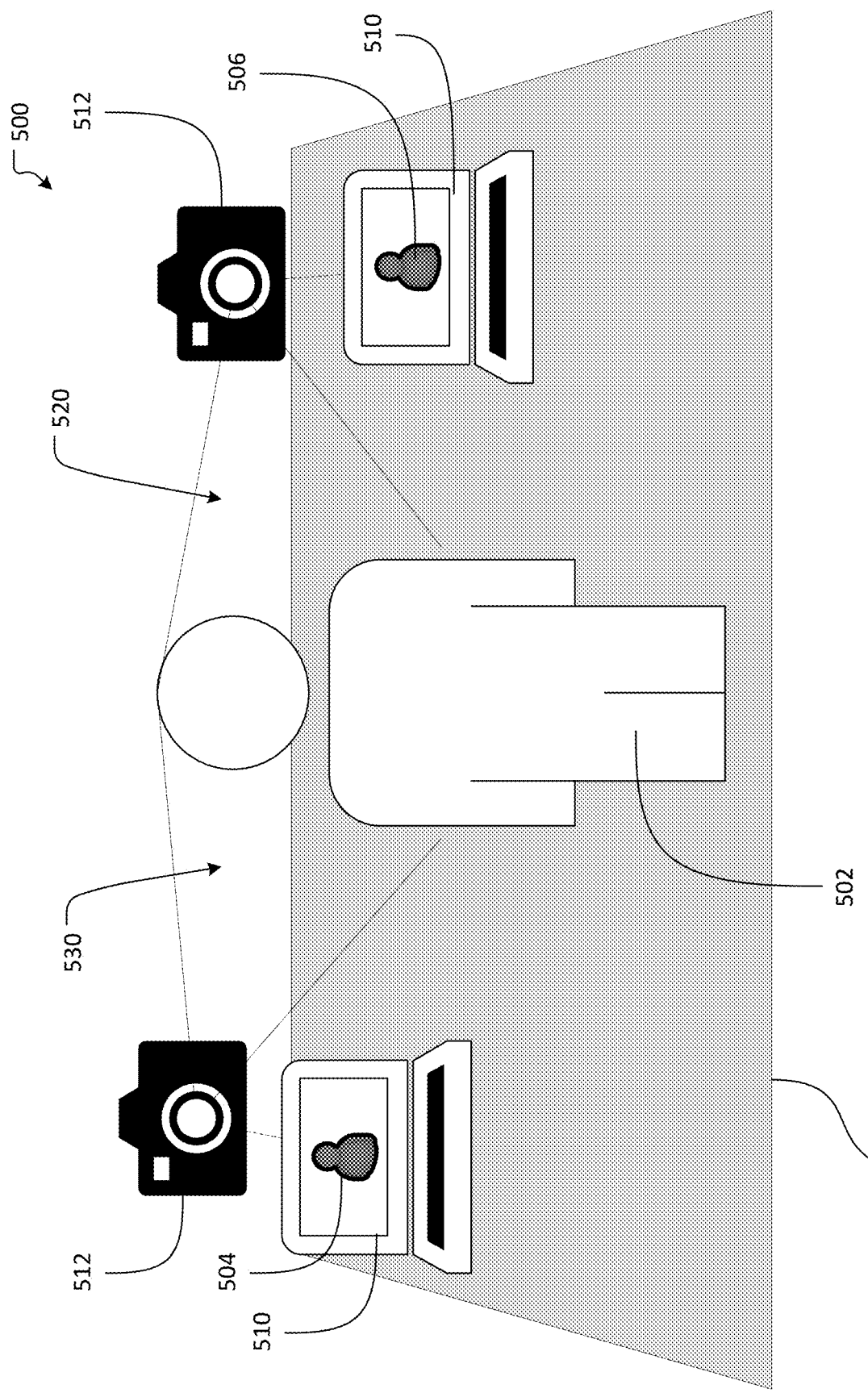
FIG. 5 illustrates an example of generating one or more views of a subject, according to some aspects described herein.

FIG. 5 illustrates an example 500 of generating one or more views of a subject, according to some aspects described herein. The example 500 includes a first subject 502, a second subject 504, and a third subject 506 within a room 508. The room 508 may be a virtual room, in some examples. Alternatively, the room 508 may be a physical room, in some examples. The first, second, and third subjects 502, 504, and 506 may be part of a hybrid meeting, such as the hybrid meeting 200, described earlier herein with respect to FIG. 2.

In some examples, the first, second, and third subjects 502, 504, and 506 are physically present within the room 508. Alternative, in some examples, one or more of the first, second, and third subjects 502, 504, and 506 are virtually present within the room 508. For example, one or more of the first, second, and third subjects 502, 504, 506 may join a hybrid meeting occurring within the room 508, via one more computing devices 510. The one or more computing device 510 may be similar to the computing devices 102, described earlier herein with respect to FIG. 1. The one or more computing device 510 may be coupled to or otherwise in communication with one or more video data sources 512. The one or more video data sources 512 may be similar to the video data source 106, described earlier herein with respect to FIG. 1. Further, in some examples, one or more of the first, second, and third subjects 502, 504, 506 may be generated avatars that exist in a virtual and/or augmented reality environment.

The first subject 502 may be viewed from a plurality of views, such as a first view 520 and/or a second view 530. The first view 520 may correspond to a location of the second subject 504. Namely, the first view 520 of the first subject 502 may correspond to a perspective in which the second subject 504 views the first subject 502. In a virtual environment, the first view 520 may be generated to provide an engaging user experience for a hybrid meeting, as if the second subject 504 were viewing the first subject 502 in-person, even if viewing so in a virtual or augmented reality environment, as part of a hybrid meeting.

The second view 530 may correspond to a location of the third subject 506. Namely, the second view 530 of the first subject 502 may correspond to a perspective in which the third subject 506 views the first subject 502. In a virtual environment, the second view 530 may be generated to provide an engaging user experience for a hybrid meeting, as if the third subject 506 were viewing the first subject 502 in-person, even if viewing so in a virtual or augmented reality environment, as part of a hybrid meeting.

The locations of the first subject 502, second subject 504, and third subject 506 may be configured by a user. Additionally, or alternatively, the locations can be updated by a user, following an initial configuration. Further, the locations may be determined based on a geometry of the room 508. For example, the room 508 may have a pre-configured shape, dimensions, angles, or other geometric features from which locations of the first, second, and third subjects 502, 504, 506 can be defined, by reference thereto.

In some examples, the first view 520 and the second view 530 may be determined based on input video streams (e.g., corresponding to the video data sources 512). However, in some examples, the first view 520 and the second view 530 may be additionally, and/or alternatively, generated based on video signal processing. For example, a machine learning model may be trained to predict or estimate one or more views (e.g., the first view 520 and/or the second view 530) of a subject (e.g., subject 502), based on an input video stream. The training of the machine learning model may include pixel approximation (e.g., locations, colors, etc.) and/or semantic association (e.g., what a pixel arrangement resembles) corresponding to an input video stream.

Figure 6:
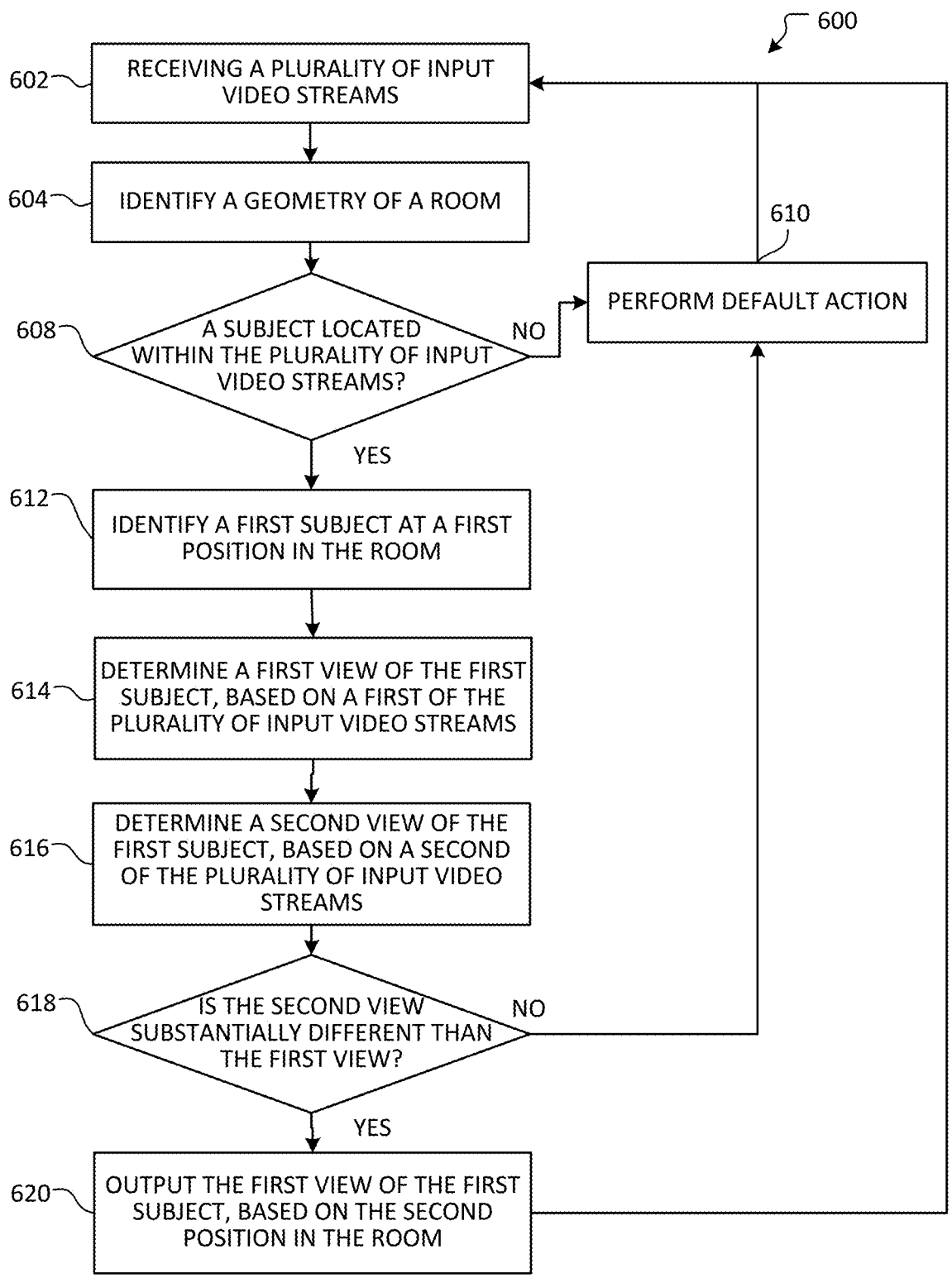
FIG. 6 illustrates an overview of an example method, according to some aspects described herein.

FIG. 6 illustrates an example method 600 according to some aspects described herein. The method 600 may be a method of representing two-dimensional images, for example, images of a user, as three-dimensional avatars or subjects in a three-dimensional environment and/or of displaying users in a videoconference, such as a videoconference as part of a hybrid meeting. In examples, aspects of method 600 are performed by a device, such as computing device 102 and/or server 104 discussed above with respect to FIG. 1.

Method 600 begins at operation 602, wherein a plurality of input video streams are received. For example, the input video streams may each be received from a video data source (e.g., video data source 106 discussed above with respect to FIG. 1). As mentioned above, the video data source may be, for example a webcam, video camera, video file, etc. In some examples, the operation 602 may include obtaining the input video streams. For example, the input video streams may be obtained by executing commands, via a processor, that cause the input video streams to be received by, for example, a real subject identification component, such as the real subject identification component 114.

In some examples, the input video streams may include 3-dimensional (three-dimensional) scenes. Accordingly, aspects of the present disclosure described herein (e.g., identifying, segmenting, tracking, etc.) can be applied to the three-dimensional scenes in a similar manner as they would be applied to a two-dimensional scene. For example, systems described herein can identify a three-dimensional sub-scene of the input video stream (e.g., containing a person, or object, or animal of interest), and partition or segment a subject within the three-dimensional sub-scene.

At operation 604, a geometry of a room is identified. For example, the room may correspond to a hybrid meeting, such as the hybrid meeting 200. The geometry of the room may include a shape of the room, dimensions of the room, and/or a relative position of objects (e.g., computing devices, people, animals, etc.) within the room.

At determination 608, it is determined whether the input video streams contains a subject (e.g., one or more persons, animals, objects, etc.). The subject may be identified by one or more computing devices (e.g., computing device 102, and/or server 104). Specifically, the one or more computing devices may receive visual data from a visual data source (e.g., video data source 106) to identify a person. The visual data may be processed, using mechanisms described herein, to recognize that one or more persons, one or more animals, and/or one or more objects of interest are present. The one or more persons, one or more animals, and/or one or more objects may be recognized based on a presence of the persons, animals, and/or objects, motions of the persons, animals, and/or objects, and/or other scene properties of the input video streams, such as differences in color, contrast, lighting, spacing between subjects, etc.

Additionally, or alternatively, at determination 608, the one or more subjects may be identified by engaging with a specific software (e.g., joining a call, joining a video call, joining a chat, or the like). For example, a person may be identified by logging into a specific application (e.g., via a passcode, biometric entry, or registration number). Therefore, when the specific application is logged into, the person is thereby identified. For example, when a person joins a video call, it may be determined that the input video streams contain a subject (i.e., the person). Additionally, or alternatively, at determination 608, it may be determined that the input video streams contain a subject by identifying the subject using a radio frequency identification tag (RFID), an ID badge, a bar code, or some other means of identification that is capable of identifying a subject via some technological interface.

It will be appreciated that method 600 is provided as an example where a subject is or is not identified at determination 608. In other examples, it may be determined to request clarification or disambiguation from a user (e.g., prior to proceeding to either operation 610 or 612), as may be the case when a confidence level associated with identifying a subject is below a predetermined threshold or when multiple subjects are identified, among other examples. In examples where such clarifying user input is received, an indication of the subject may be stored (e.g., in association with the received input video stream) and used to improve accuracy when processing similar future video stream inputs.

If it is determined that there is not a subject contained within the input video streams, flow branches "NO" to operation 610, where a default action is performed. For example, the input video streams may have an associated pre-configured action. In other examples, method 600 may comprise determining whether the input video streams have an associated default action, such that, in some instances, no action may be performed as a result of the received input video streams (e.g., one or more of the input video streams may be displayed using conventional methods). Method 600 may terminate at operation 610. Alternatively, method 600 may return to operation 602 to provide a continuous video stream feedback loop.

If however, it is determined that the input video stream contains a subject, flow instead branches "YES" to operation 612, where a first subject is identified at a first position in the room. The first subject may be a person, animal, object, etc. Further, the first subject may be a virtual person, animal, object, etc. or a real (e.g., physical) person, animal, object, etc. Further, the first subject may be identified in each of the plurality of input video streams, such as, for example by visual recognition of common characteristics within each of the input video streams that correspond to the first subject.

At operation 614, a first view of the first subject is determined, based on a first of the plurality of input video streams. The first view may be similar to the first view 520 shown with respect to FIG. 5. The first of the plurality of input streams may correspond to a first of the plurality of computing devices. The first view may be determined with respect to a second position in the room. The second position in the room may be a location at which a second subject (e.g., a person or a computing device corresponding to a person) is located. Accordingly, the first view of the first subject may correspond to a perspective of the second subject (e.g., a person looking at the first subject, in-person, through a computing device, and/or through an HMD).

At operation 616, a second view of the first subject is determined, based on a second of the plurality of input video streams. The second view may be similar to the second view 530 shown with respect to FIG. 5. The second of the plurality of input streams may correspond to a second of the plurality of computing devices. The second view may be determined with respect to a third position in the room. The third position in the room may be a location at which a third subject (e.g., a person or a computing device corresponding to a person) is located. Accordingly, the second view of the first subject may correspond to a perspective of the third subject (e.g., a person looking at the first subject, in-person, through a computing device, and/or through an HMD).

At determination 618, it is determined whether the second view of operation 616 is substantially different from the first view of operation 614. The determining of whether the second view is substantially different from the first view may include calculating an error between visual components of the first view and visual components of the second view. A user may configure a predetermined threshold at which the second view is determined to be substantially different from the first view.

If it is determined that the second view is not substantially different than the first view, flow branches "NO" to operation 610, where a default action is performed. For example, one of the plurality of input video streams may be output, without further processing, to reduce a computational workload of mechanisms described herein. Additionally, or alternatively, in some examples, the first view or the second view may have an associated pre-configured action. In other examples, method 400 may comprise determining whether the first view or the second view have an associated default action, such that, in some instances, no action may be performed as a result of the determined first view and/or second view of the first subject. Method 600 may terminate at operation 610. Alternatively, method 600 may return to operation 602 to provide a continuous video stream feedback loop.

If however, it is determined that the second view is substantially different than the first view, flow instead branches "YES" to operation 620, where the first view of the first subject is output, based on the second position in the room.

Generally, using mechanism disclosed herein, a first person or first participant in a hybrid meeting may be projected or otherwise generated in a room that other participants, such as a second person and a third person, may be looking into (e.g., via head mounted displays or other computing devices). Different views of the first person may be output to computing devices corresponding to the second person and the third person, based on relative positions of each of the participants, within the hybrid meeting.

Method 600 may terminate at operation 620. Alternatively, method 600 may return to operation 602 to provide a continuous video stream feedback loop. The method 600 may be run continuously. Additionally, or alternatively, the method 600 may iterate through at specified intervals over regular or irregular durations of time. Alternatively, the method 600 may be triggered to execute by a specific action, such as, for example, by a computing device that receives an input video stream and/or by a user that executes a specific command.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
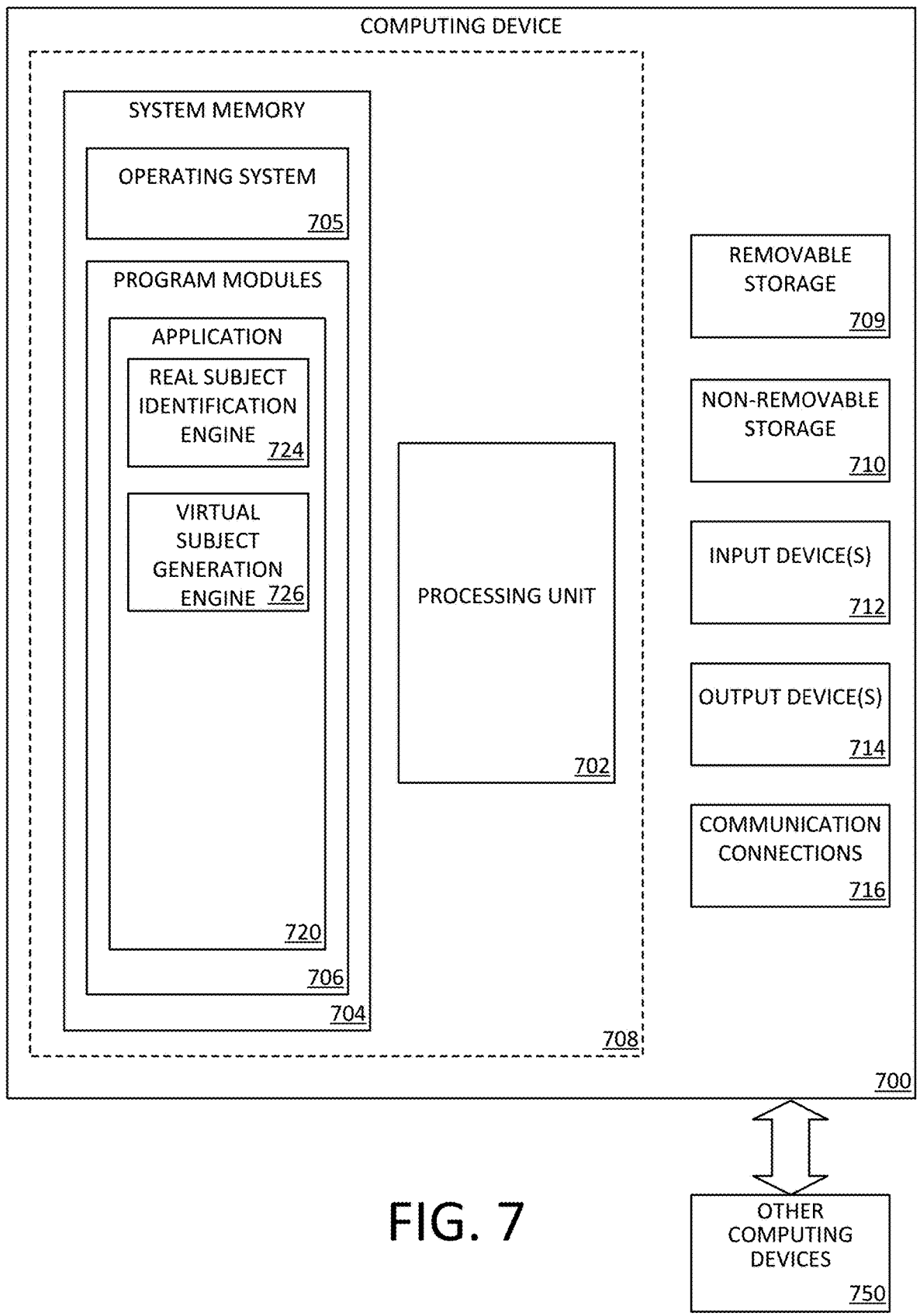
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including computing device 102 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store real subject identification engine 724 and/or virtual subject generation engine 726. The operating system 705, for example, may be suitable for controlling the operation of the computing device 700.

Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
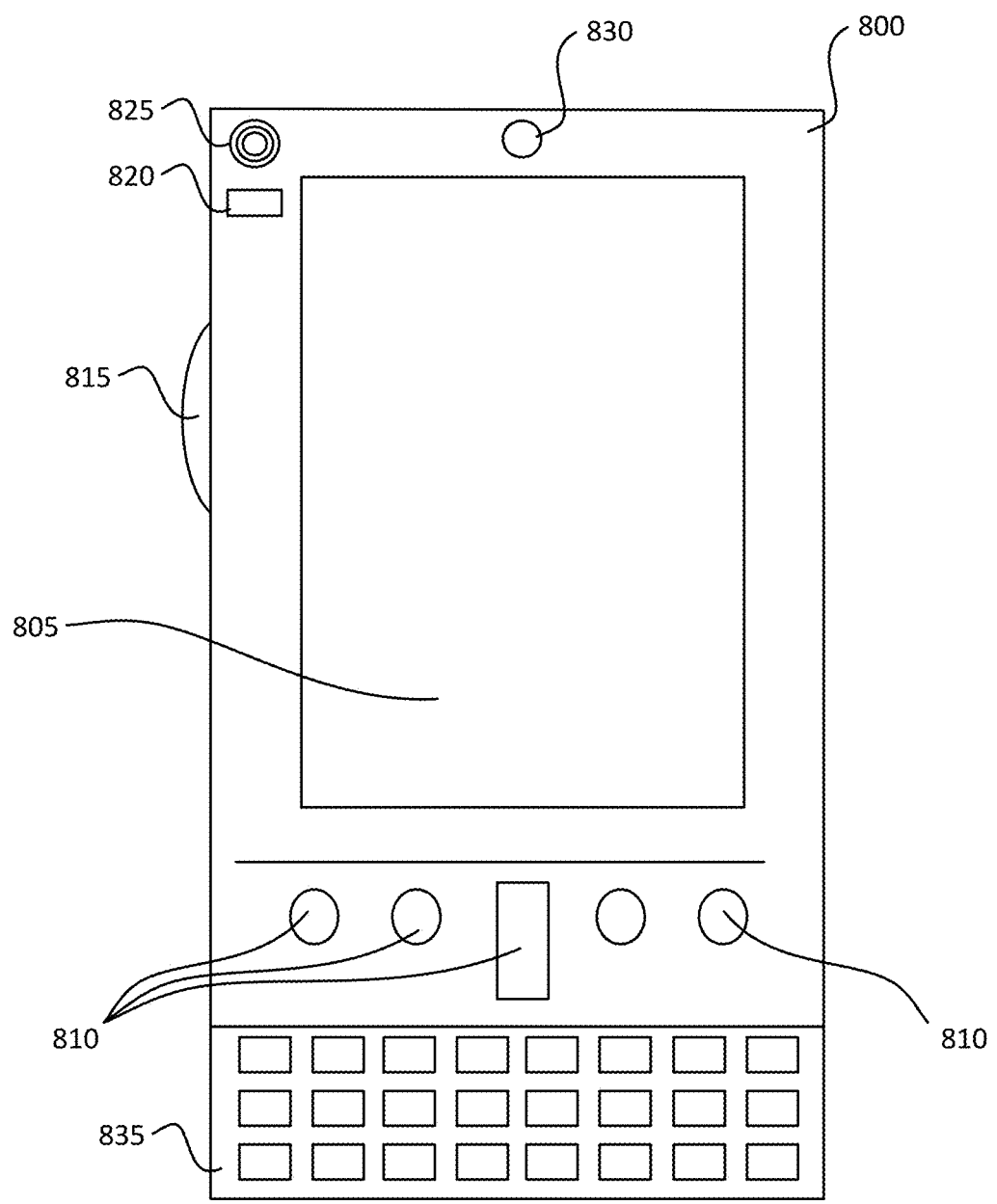
FIGS. 8A and 8B are simplified block diagrams of a mobile computing device with which aspects of the present disclosure may be practiced.
Figure 8B:
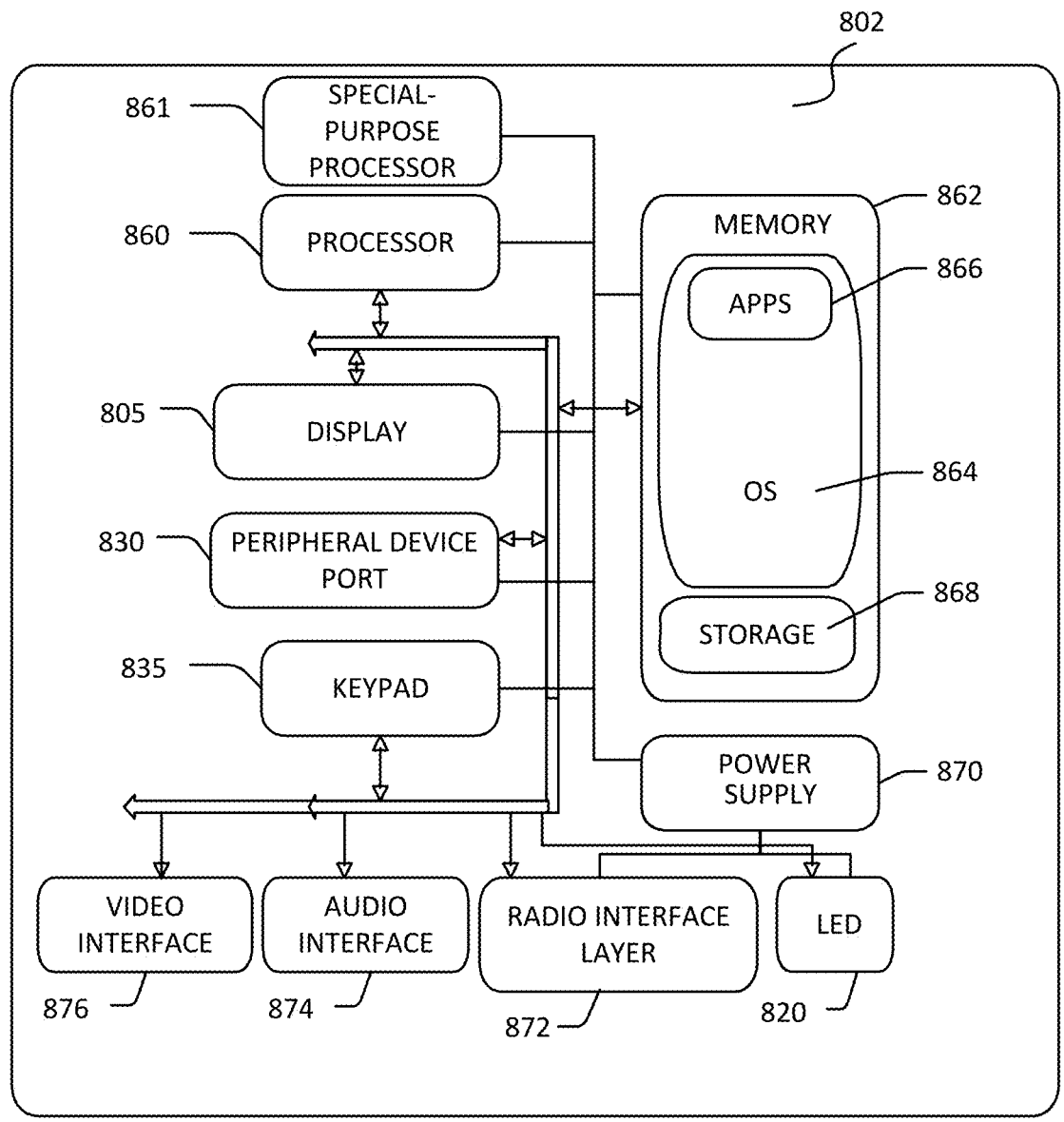

FIGS. 8A and 8B illustrate a mobile computing device 800, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some examples.

In yet another alternative example, the mobile computing device 800 is a portable phone system, such as a cellular phone. The mobile computing device 800 may also include an optional keypad 835. Optional keypad 835 may be a physical keypad or a "soft" keypad generated on the touch screen display.

In various examples, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one examples, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., a real subject identification engine, a virtual subject generation engine, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and/or special-purpose processor 861 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
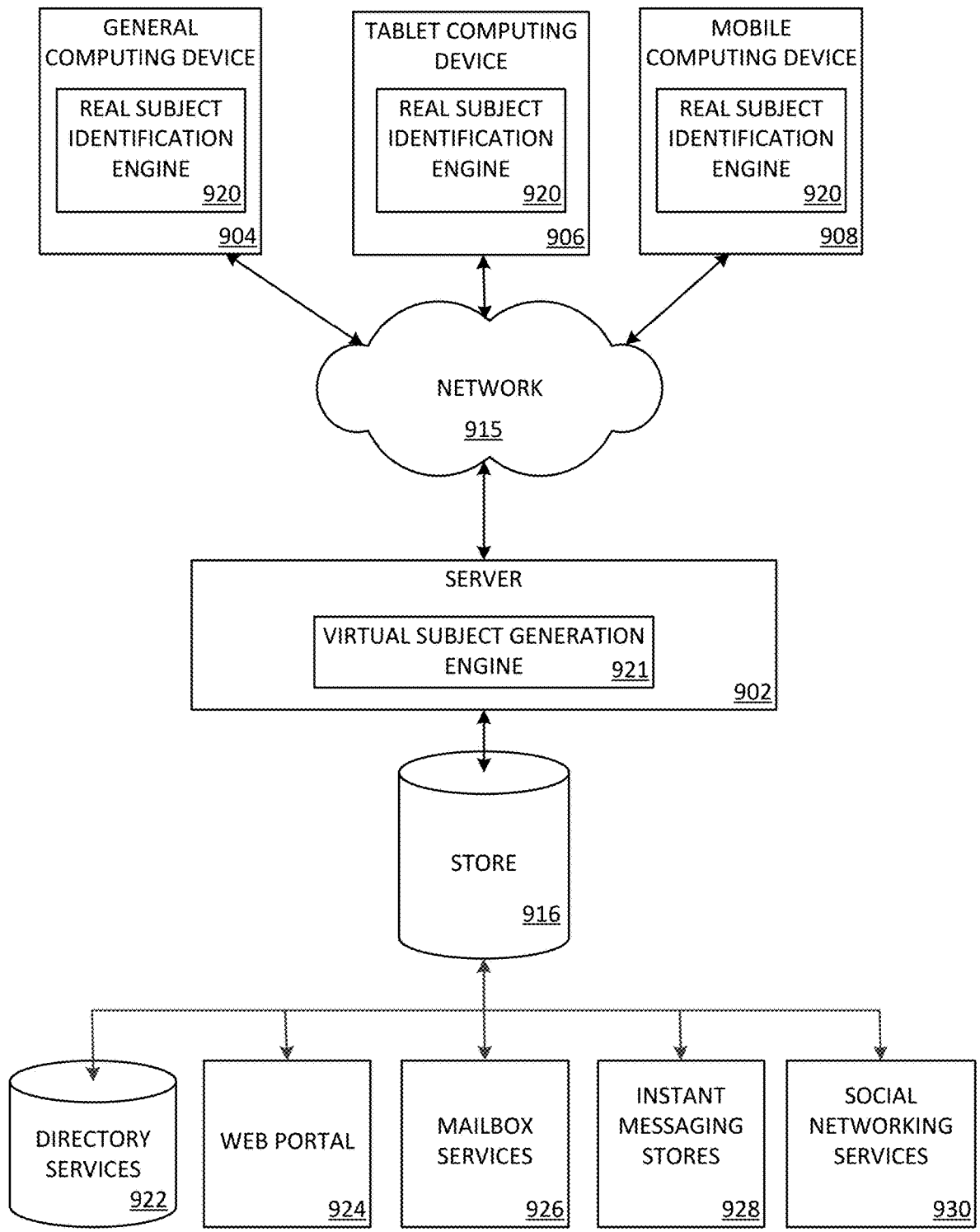
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A real subject identification engine 920 may be employed by a client that communicates with server device 902, and/or virtual subject generation engine 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these examples of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for representing two-dimensional representations as three-dimensional avatars according to at least the examples provided in the sections below. Any of the one or more examples provided herein may be used in combination with any other of the one or more examples provided herein.

In some examples, a method of creating a virtual avatar is provided. The method includes receiving one or more input video streams, identifying a first subject, within the one or more input video streams, identifying, based on the one or more input video streams, a first view of the first subject, identifying, based on the one or more input video streams, a second view of the first subject, and segmenting the first subject into a plurality of planar objects. The plurality of planar objects are transformed with respect to each other, and the plurality of planar objects are based on the first and second views of the first subject. The method further includes outputting the plurality of planar objects in an output video stream. The plurality of planar objects provide perspective of the first subject to one or more viewers.

In some examples, a method of creating a virtual avatar is provided. The method includes receiving a plurality of input video streams, identifying a first subject, within the plurality of input video streams, identifying, based on the plurality of input video streams, a plurality of views of the first subject, and segmenting the first subject into a plurality of planar objects. The plurality of planar objects are transformed with respect to each other, and the plurality of planar objects are based on the plurality of views of the first subject. The method further includes outputting the plurality of planar objects in an output video stream. The plurality of planar objects provide perspective of the first subject to one or more viewers.

In some examples, the plurality of planar objects are billboards.

In some examples, each of the billboards faces a camera.

In some examples, the planar objects are connected via virtual joints, and the virtual joints are articular points of rotation.

In some examples, the one or more input video streams are received from one or more cameras.

In some examples, the first subject is identified within a room. The room is a hybrid meeting space.

In some examples, the hybrid meeting space includes a plurality of participants disposed therein who are two or more from the group of: physically in the room, virtually displayed within the room, and represented within the room via a virtual avatar.

In some examples, the first subject is one of a person, an animal, or an object.

In some examples, the first subject includes one or more pivot points at which two or more portions of the first subject are configured to rotate thereabout, and the plurality of billboards are segmented at the pivot points.

In some examples, at least one of the plurality of billboards is a curved plane.

In some examples, the output video stream is output to a head-mounted display (HMD).

In some examples, a method is provided. The method includes receiving a plurality of input video streams as part of a hybrid meeting, identifying a geometry of a room corresponding to the hybrid meeting, identifying a first subject at a first position in the room, determining a first view of the first subject, with respect to a second position in the room, and based on a first of the plurality of input video streams, determining a second view of the first subject, with respect to a third position in the room, and based on a second of the plurality of input video streams, and outputting the first view of the first subject, based on the second position in the room.

Some examples further include identifying a second subject at the second position in the room and identifying a third subject at the third position in the room. The first view of the first subject corresponds to a perspective of the second subject. Further, the second view of the first subject corresponds to a perspective of the third subject.

In some examples, one or more of the first, second, and third subjects are people.

In some examples, the second view of the first subject is output, based on the third position in the room. Further, the output second view is received by a computing device corresponding to the third subject in the room.

In some examples, the output first view is received by a computing device corresponding to the second subject in the room.

In some examples, the plurality of input video streams are received from a plurality of cameras.

In some examples, the hybrid meeting includes a plurality of participants who are two or more from the group of: physically in the room, virtually displayed within the room, and represented within the room via a virtual avatar.

In some examples, a system is provided. The system include a head-mounted display (HMD), a display screen, at least one processor, and memory storing instructions that, when executed by the at least one processor, cause the system to perform a set of operations. The set of operations include receiving one or more input video streams, identifying a first subject, within the one or more input video streams, identifying a first view of the first subject, based on the one or more input video streams, identifying a second view of the first subject, based on the one or more input video streams, outputting the first view of the first subject to the HMD, and outputting the second view of the first subject to the display screen.

In some examples, the HMD is located at a first location within a hybrid meeting space, and the display screen is located at a second location within the hybrid meeting space.

In some examples, the first view of the first subject corresponds to the first location, and the second view of the first subject corresponds to the second location.

In some examples, the HMD is one of an augmented-reality headset or a virtual-reality headset.

In some examples, the one or more input video streams are received as part of a hybrid meeting.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of creating a virtual avatar, the method comprising:
   receiving one or more input video streams;
   identifying a first subject, within the one or more input video streams;
   identifying, based on the one or more input video streams, a first view of the first subject;
   identifying, based on the one or more input video streams, a second view of the first subject;
   determining whether the second view is substantially different than the first view;
   in response to determining that the second view is substantially different than the first view, segmenting the first subject into a plurality of planar objects, the plurality of planar objects being transformed with respect to each other, and the plurality of planar objects being based on the first view and the second view of the first subject; and
   outputting the plurality of planar objects in an output video stream, whereby the plurality of planar objects provide perspective of the first subject to one or more viewers.

2. The method of claim 1, wherein the plurality of planar objects are billboards.

3. The method of claim 2, wherein each of the billboards face a camera.

4. The method of claim 1, wherein the plurality of planar objects are connected via virtual joints, and wherein the virtual joints are articular points of rotation.

5. The method of claim 1, wherein the first subject is identified within a room, and wherein the room is a hybrid meeting space.

6. The method of claim 5, wherein the hybrid meeting space includes a plurality of participants disposed therein who are two or more from the group of: physically in the room, virtually displayed within the room, and represented within the room via a respective virtual avatar.

7. The method of claim 1, wherein the first subject is one of a person, an animal, or an object.

8. The method of claim 1, wherein the first subject includes one or more pivot points at which two or more portions of the first subject are configured to rotate thereabout, and wherein the plurality of planar objects are segmented at the one or more pivot points.

9. A method of creating a virtual avatar, the method comprising:
   receiving a plurality of input video streams;
   identifying a first subject, within the plurality of input video streams;
   identifying, based on the plurality of input video streams, a plurality of views of the first subject;
   determining whether the second view is substantially different than the first view;
   in response to determining that the second view is substantially different than the first view, segmenting the first subject into a plurality of planar objects, the plurality of planar objects being transformed with respect to each other, and the plurality of planar objects being based on the plurality of views of the first subject; and
   outputting the plurality of planar objects in an output video stream, whereby the plurality of planar objects provide perspective of the first subject to one or more viewers.

10. The method of claim 9, wherein the plurality of planar objects are billboards.

11. The method of claim 10, wherein each of the billboards face a camera.

12. The method of claim 9, wherein the plurality of planar objects are connected via virtual joints, and wherein the virtual joints are articular points of rotation.

13. The method of claim 9, wherein the first subject is identified within a room, and wherein the room is a hybrid meeting space.

14. The method of claim 13, wherein the hybrid meeting space includes a plurality of participants disposed therein who are two or more from the group of: physically in the room, virtually displayed within the room, and represented within the room via a respective virtual avatar.

15. The method of claim 9, wherein the first subject includes one or more pivot points at which two or more portions of the first subject are configured to rotate thereabout, and wherein the plurality of planar objects are segmented at the one or more pivot points.

16. A system, the system comprising:
   a head-mounted display (HMD);
   a display screen;
   at least one processor;
   memory storing instructions that, when executed by the at least one processor, cause the system to perform a set of operations, the set of operations comprising:
   receiving one or more input video streams;

identifying a first subject, within the one or more input video streams;

identifying a first view of the first subject, based on the one or more input video streams;

identifying a second view of the first subject, based on the one or more input video streams, wherein the second view is different than the first view;

outputting the first view of the first subject to the HMD; and outputting the second view of the first subject to the display screen, such that a different view of the first subject is output to the HMD compared to the display screen.

17. The system of claim 16, wherein the HMD is located at a first location within a hybrid meeting space, and wherein the display screen is located at a second location within the hybrid meeting space.

18. The system of claim 17, wherein the first view of the first subject corresponds to the first location, and wherein the second view of the first subject corresponds to the second location.

19. The system of claim 16, wherein the HMD is one of an augmented-reality headset or a virtual-reality headset.

20. The system of claim 16, wherein the one or more input video streams are received as part of a hybrid meeting.

* * * * *